G. A. SEBELIUS.
RAKE CLEANER.
APPLICATION FILED FEB. 11, 1914.
1,113,059.
Patented Oct. 6, 1914.
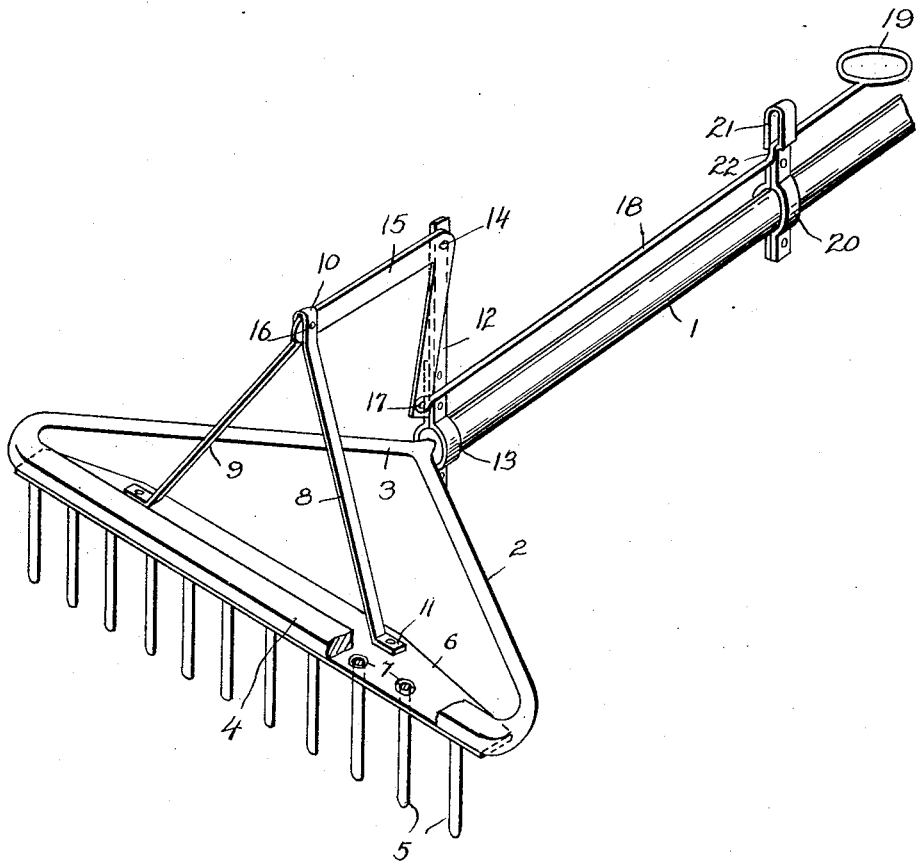

UNITED STATES PATENT OFFICE.

GILL A. SEBELIUS, OF OVERLY, NORTH DAKOTA.

RAKE-CLEANER.

1,113,059.  Specification of Letters Patent.  Patented Oct. 6, 1914.

Application filed February 11, 1914. Serial No. 818,096.

*To all whom it may concern:*

Be it known that I, GILL A. SEBELIUS, a citizen of the United States, residing at Overly, in the county of Bottineau and State of North Dakota, have invented certain new and useful Improvements in Rake-Cleaners; and I do hereby declare the following to be a full, clear, and exact description of the invention, such as will enable others skilled in the art to which it appertains to make and use the same.

My invention relates to new and useful improvements in rakes and more particularly to a rake cleaner which may be operated to strip the rake teeth of trash or other foreign matter which may have gathered thereon, in a reliable and expeditious manner.

An important object of my invention is to provide a rake cleaner of the character described which is constructed so that it may be readily locked in inoperative position so that accidental downward movement of the rake stripping means is prevented while the rake is being used to perform its usual functions.

Another important object of my invention is to provide a rake cleaner of the character described which is simple as to construction, reliable and efficient in operation, capable of being readily attached to all characters of rakes and cheap to manufacture.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts: the figure represents a perspective view of my improved rake cleaner showing the stripping bar in an up and inoperative position.

Referring to the drawings by characters of reference, the numeral 1 designates a handle that is secured at one end to securing bars 2 and 3 that are carried by the rake head 4. This rake head 4 carries the usual teeth 5.

Slidably mounted upon the teeth 5 is a stripping bar 6 having a plurality of teeth receiving apertures 7 formed therein. The rear edge of this stripping bar 6 is extended inwardly beyond the inner edge of the head 4 and has secured thereto upwardly converging supporting arms 8 and 9 which are formed integral and provide a U-shaped portion 10 at their upper terminals. The lower terminals of the supporting bars 8 and 9 are provided with lateral apertured extensions 11 to receive fastening means for the purpose of securing the arms to the stripping bar.

An upstanding bracket or standard 12 is secured around the inner end of the handle 1 by means of a securing ring or collar 13 formed on the lower end of the standard and clamped on the handle 1. Pivoted at the upper or outer end of the standard 12 as at 14 is a bell crank lever 15 that is pivotally secured at one end as at 16 within the U-shaped portion 10 at the upper portions of the arms 8 and 9. The other terminal of this bell crank lever 15 is pivotally connected as at 17 with an operating rod 18 that is mounted longitudinally of and upon the handle 1 and provided with a loop at its outer end forming a hand grip 19.

A bracket 20 formed of a single piece of metal is clamped upon the handle 1 at a point intermediate the ends of the operating rod 18 and is offset at its upper portion to provide a loop 21 through which the rod 18 is inserted. The rod 18 is offset intermediate its ends to provide a stop shoulder 22 that is arranged to coöperate with the bracket 20 to hold the stripping bar 6 in normal position as will be clearly seen with reference to the drawing. That portion of the rod 18 comprehended between the shoulder 22 and hand grip 19 is, when the stripping bar is in normal position, disposed in engagement with the lower face of the loop 21 while the shoulder 22 engages the portion of the bracket comprehended between its secured portion and the loop and thus is prevented the outward movement necessary to bring about the downward movement of the stripping bar 6.

It will thus be seen that accidental operation of the stripping bar while the rake is being used to perform its ordinary or usual function, is prevented.

To strip the teeth of trash or other foreign matter which may have collected thereon, the rod 18 is moved upwardly so that the shoulder 22 is free to slide through the loop 21 and the rod is pulled outwardly causing the bell crank to be operated so that the end thereof that is secured as at 16 to the U-shaped portions 10 on the arms 8 and 9 is moved downwardly causing the stripper bar to be moved toward the outer end of the teeth 5. After the cleaning operation the rod is set as shown in the figure in the drawing to hold the stripping bar in an out of the way position.

It will be readily seen with reference to the foregoing description and accompanying drawings that I have provided a simple, inexpensive and effectual rake cleaner which may be readily attached to rakes of all characters in a reliable and expeditious manner. The bracket 20 and standard 12 are detachably secured in any suitable manner upon the handle 1 and the other parts may be likewise detachably secured so as to facilitate an expeditious attaching and detaching of the device upon rakes of different characters.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What is claimed is:—

1. A rake cleaner comprising a stripping bar, a pair of upwardly converging arms secured upon said stripping bar and formed integral at their upper terminals, a bell crank operatively connected with said rake and the upper terminals of said arms, an operating rod operatively connected with said bell crank, a bracket mounted upon said rake and slidably receiving said rod and a stop shoulder formed on said rod arranged to coöperate with said bracket to hold said stripping bar in inoperative position.

2. The combination with a rake comprising a handle having a head carrying teeth thereon of a stripping bar slidably mounted upon said teeth, a pair of upwardly converging arms secured upon said gripping bar and formed integral at their upper terminals, a standard secured upon and extending at right angles to said handle, a bell crank pivoted on said standard and having one terminal pivotally connected with the upper terminals of said arms, a bracket mounted upon said handle, an operating rod slidable through said bracket and pivotally connected at one terminal with said bell crank, said rod being offset intermediate its ends to provide a stop shoulder arranged to coöperate with said bracket to hold the stripping bar in inoperative position, and a hand grip formed on the free end of said rod and disposed adjacent to the free end of said rake handle.

In testimony whereof I affix my signature in presence of two witnesses.

GILL A. SEBELIUS.

Witnesses:
E. C. MARTIN,
PAUL PIETON.